Patented May 23, 1950

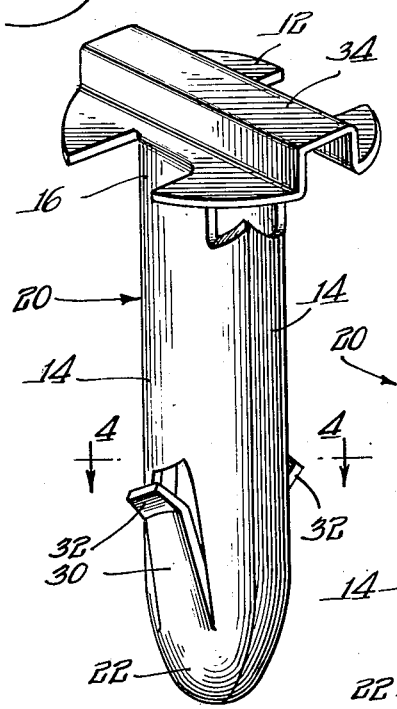
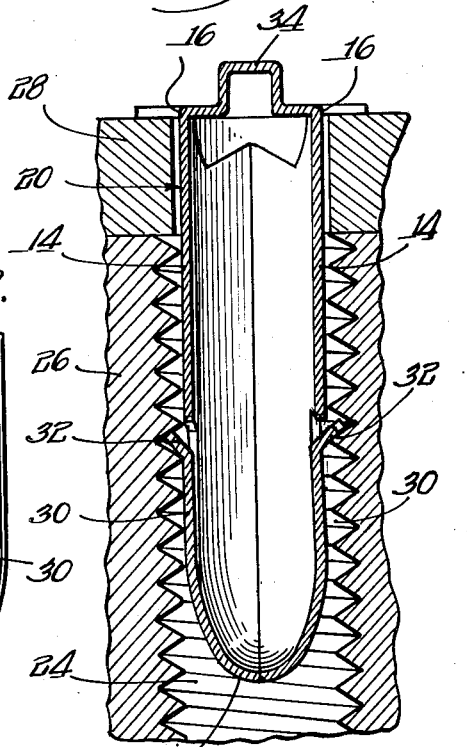
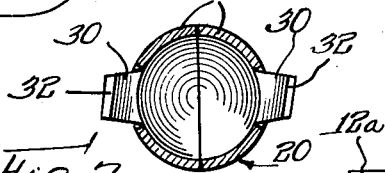
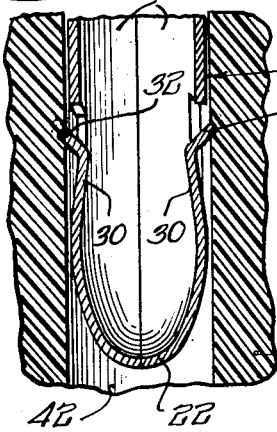
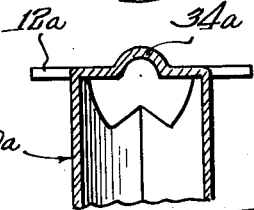
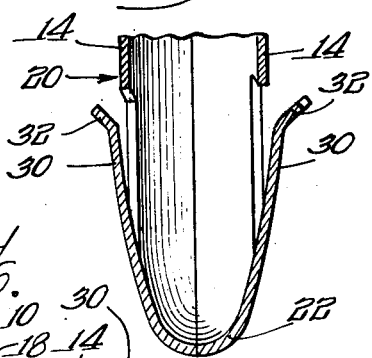
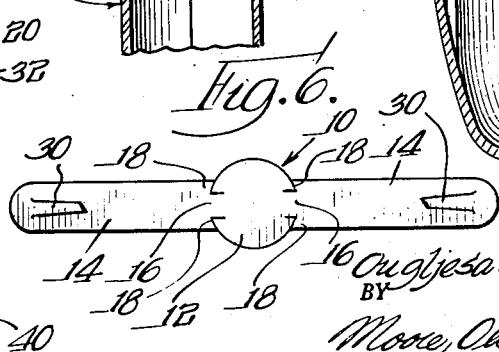

2,509,192

UNITED STATES PATENT OFFICE 2,509,192

DRIVE FASTENER

Ougljesa Jules Poupitch, Chicago, Ill., assignor to Illinois Tool Works, Chicago, Ill., a corporation of Illinois Application June 19, 1947, Serial No. 755,676

8 Claims. (Cl. 85—5)

This invention relates to fastening devices formed of sheet material and adapted for use in place of bolts, screws and like fasteners.

An object of this invention is to provide an improved fastener of the aforesaid type which is readily inserted into a work aperture by applying a relatively small force thereto in a given axial direction but which resists removal by force applied axially thereto in the opposite direction.

It is a further object to provide a drive fastener formed of sheet material which is adapted to be removed from the work by rotation of the fastener relative to the work, and which may be used with equal facility in tapped and untapped apertures.

A further object is to provide a novel drive fastener having the above-mentioned attributes and which may be manufactured by well known methods of stamping and forming sheet material, one preferred form of such fastener comprising a rigid, tubular shank provided with resilient tongues each formed and adapted to cooperate with a screw thread or to follow a helical path when the fastener is withdrawn from the work.

Various other features of the invention will be apparent from a study of the specification and the accompanying drawing, wherein:

Fig. 1 is a perspective view of a fastener constructed in accordance with and embodying the principles of the invention;

Fig. 2 is a partial elevational view of the fastener;

Fig. 3 is a longitudinal section through the fastener and work piece, showing the fastener mounted in a tapped work aperture;

Fig. 4 is a cross section taken on the line 4—4 in Fig. 1;

Fig. 5 is a fragmentary longitudinal section showing a portion of the fastener prior to insertion thereof in the work;

Fig. 6 is a plan view of the blank from which the fastener is formed;

Fig. 7 is a partial section similar to Fig. 3, but showing the fastener mounted in an untapped work aperture; and Fig. 8 is a fragmentary longitudinal section of a modified fastener.

The fastener which is illustrated in Figs. 1 through 5 is formed from a blank 10 such as that illustrated in Fig. 6. This blank has a head portion 12 located centrally thereof and legs 14 extending from the head 12. The head 12 is of substantially circular shape and is connected to the legs 14 by reduced neck portions 16 that are defined by short, angular slits 18 which partially separate each leg 14 from the head 12. In forming the fastener, the legs 14 are shaped as complementary channel members and the necks 16 are bent at right angles to the head 12 to bring the legs 14 into abutting relation along their respective longitudinal edges. The legs or channel members 14 together constitute a tubular stud or shank 20 of the fastener. The forward ends of the legs 14 are rounded to afford a nose 22 for the shank 20.

The shank 20 is adapted for insertion in an aperture such as 24, Fig. 3, in a work piece as 26. The head 12 is adapted to bear against the outer surface of an object 28 such as a panel or pad of material that is to be secured to the work piece 26. For the purpose of retaining the fastener in the work piece 26 against retrograde movement, tongues 30 are struck out from the legs 14. Each tongue 30 is sheared from its respective leg 14 on three sides thereof, being anchored to the leg 14 at the end of the tongue 30 which is nearest the nose 22. The tongues 30 diverge outwardly toward the head end of the stud or shank 20 and terminate in lips 32 which are bent outwardly from the tongues 30. Each of the lips 32 is disposed obliquely at a given lead angle with respect to a plane normal to the axis of the shank 20, thereby to enable removal of the fastener from the work piece 26 by unscrewing the fastener. Where the work piece 26 is of relatively hard material such as metal, I prefer to tap the aperture 24 so as to facilitate removal of the fastener by unscrewing action.

The tongues 30 preferably are formed with side edges that converge toward the free ends of the tongues, and they should have sufficient clearance with respect to the edges of the corresponding apertures in the shank 20 so that there is no possibility of a tongue becoming wedged in its aperture. Where the fastener is formed from thin stock, the provision of such clearance ordinarily is inherent in the operation of shearing each tongue 30 from the leg 14 while the latter is flat. In the case of thicker sheet stock, it may be preferable to round each leg 14 prior to shearing the tongue 30 therefrom. Another method is to crimp or arch each tongue 30 so as to reduce either its subtended length or width somewhat.

The head 12 of the fastener may be formed with a rib 34, Figs. 1 and 3, extending diametrically across it, or in any other suitable manner so that a wrench or other tool may be applied to the head 12 for removing the fastener from the work. If desired, however, the head may be modified as shown in Fig. 8 wherein the rib 34a is provided primarily to reinforce the head 12a, making removal of the fastener by unauthorized persons difficult.

The fastener is readily inserted in the work aperture by pushing or driving the stud portion 20 axially into the aperture until the head 12 is arrested by the work. Thereafter the fastener resists any stress applied thereto longitudinally of the stud 20, and it also has sufficient friction, by virtue of the resilient tongues 30 which urge the lips 32 into engagement with the wall of the aperture, to resist any normal tendency of the stud to turn in the aperture under the influence of vibratory or like forces. Obviously the fastener is adapted also to be screwed into the aperture, although customarily it would be driven in by a hammer or like tool. The stud 20 is relatively rigid by virtue of the edge-to-edge abutting relation of the legs 14 and preferably it is of such diameter that it fits tightly in the work aperture, thereby increasing the frictional retaining force acting upon the fastener. The fastener is very simple in construction and may be manufactured cheaply in comparison with drive-in screws and similar fastening devices previously known to the art.

Where the fastener is to be mounted in a work piece of material having sufficient softness so that the lips 32 may penetrate such material, it is not necessary to tap the work aperture. For example, referring to Fig. 7, a work piece 40 of plastic would be provided merely with a straight aperture 42 into which the shank 20 of the fastener is inserted. The lips 32 penetrate and grip the material to such an extent that the fastener can be removed therefrom only by being unscrewed. An additional advantage of the device is that it may be driven into the plastic and then given a final twist to bring the head under greater tension with the face of the work. This feature has many evident advantages and greatly increases the utility of drive-in screw-out fasteners. The tongues 30, by reason of their resiliency, yield sufficiently to prevent damage to the work while at the same time applying the requisite degree of pressure to the lips 32.

It is obvious that various changes may be made in the specific embodiments set forth for purposes of illustration without departing from the spirit of the invention. The invention is accordingly not to be limited to the specific embodiments shown and described, but only as indicated in the following claims.

The invention is hereby claimed as follows:

1. A one-piece fastener formed of sheet material and comprising a pair of channel-shaped shank sections arranged to provide a tubular shank, a head on said shank for engaging the surface of a work body, and tongues struck out from said shank sections to engage the wall of the work aperture, said tongues terminating in work engaging end portions presenting lips having edges disposed obliquely in conformity with the thread helix of a complementary work aperture whereby the fastener may be removed from the work only by being unscrewed therefrom.

2. A fastener as defined in claim 1, wherein said head is formed to cooperate with a tool for turning the fastener.

3. A one-piece fastener formed of sheet material and comprising a head, a tubular shank extending from said head, tongues struck out from said shank, said tongues terminating in work-engaging end portions obliquely disposed with respect to a plane normal to the shank axis, whereby to permit rotative disengagement of the fastener from a work piece while resisting straight axial disengagement of the fastener from the work piece, and a rib extending across said head.

4. A fastener of the type described comprising a pair of elongated channel-shaped members arranged to form a substantially rigid tubular shank, a head interconnecting said channel members and adapted to limit insertion of the shank into a work aperture, and work-gripping projections sheared from said channel members and diverging therefrom toward the head end of the shank, said projections having work-engaging lips oblique with respect to a plane normal to the axis of the shank, whereby the fastener may be removed from the work only by being unscrewed therefrom.

5. A fastener of the type described comprising a head, shank portions integral with said head and arranged diametrically opposite each other, said shank portions extending in parallel relation to each other from said head and presenting a rounded nose portion to facilitate application of the fastener to a work aperture, and tongues sheared from said shank portions from within the peripheral margins thereof, said tongues at the free extremities having oblique edges for lockingly engaging the wall defining a complementary work aperture, whereby said fastener may be removed from said work aperture only by rotation of said fastener relative to said work.

6. A fastener formed of sheet material and comprising a head, a tubular shank extending from said head, and a tongue struck out from said shank and terminating in a work-engaging lip arranged to resist straight axial disengagement of the fastener from the work piece, said lip being disposed in conformity with the lead angle of a helix whereby the fastener may be unscrewed from the work piece.

7. A fastener formed of sheet material and comprising a pair of channel-shaped members arranged to provide a rigid tubular stud adapted to fit tightly in a work aperture, a head on said stud for engaging the surface of a work body, tongues diverging from said stud toward the head end thereof to engage the wall of the work aperture, and oblique lips on said tongues each arranged on a helix whereby the fastener is constrained to move rotatively when being withdrawn from the work aperture.

8. A fastener formed from a flat blank and comprising a head portion, leg portions partially severed from said head portion and formed to provide a rigid tubular stud extending from said head, said stud terminating in a rounded nose portion, resilient tongues on said stud extending away from the nose and terminating in work-engaging lips arranged on a helix whereby the fastener may be withdrawn from the work by imparting relative rotary motion thereto, and a protuberance on said head to facilitate the application of a tool for turning the fastener.

OUGLJESA JULES POUPITCH.

REFERENCES CITED

The following references are of record in the file of this patent:

UNITED STATES PATENTS

| Number | Name | Date |
| --- | --- | --- |
| 1,375,671 | Cerf | Apr. 26, 1921 |
| 2,391,298 | Davis | Dec. 18, 1945 |